July 19, 1960
J. ULDERUP ET AL
2,945,365
FLEXIBLE COUPLING DEVICE
Filed May 7, 1958
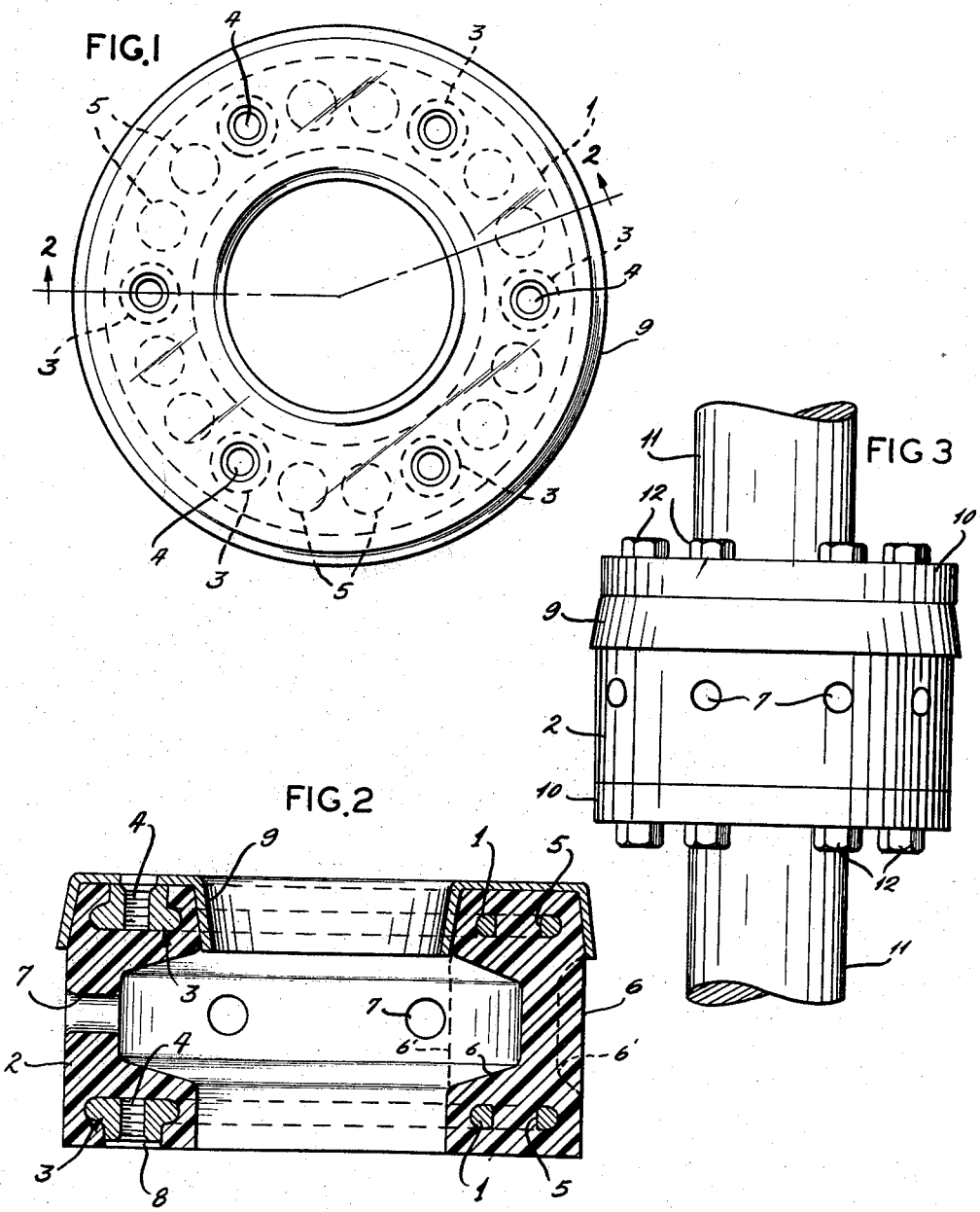
INVENTORS:
JÜRGEN ULDERUP FRANZ G. REUTER
FRITZ JÄCKEL
ATTORNEYS.

United States Patent Office 2,945,365
Patented July 19, 1960

2,945,365

FLEXIBLE COUPLING DEVICE

Jurgen Ulderup and Franz Gottfried Reüter, Lemforde, Hannover, and Fritz Jäckel, Bielefeld, Germany, assignors, by mesne assignments, to Mobay Chemical Company, Pittsburgh, Pa., a corporation of Delaware Filed May 7, 1958, Ser. No. 733,735

Claims priority, application Germany May 11, 1957

7 Claims. (Cl. 64—11)

This invention relates generally to a flexible coupling device and more particularly to an improved coupling device for connecting flanged ends of shafts together.

It has been proposed heretofore to provide flexible coupling devices for joining the ends of shafts together. These coupling devices are usually of a notched design, with alternating protrusions and recesses in opposing engaging surfaces. Moreover, unit size of the heretofore available coupling devices have been relatively large in proportion to the amount of torque transmitted through the coupling.

It is, therefore, an object of this invention to provide a flexible shaft coupling device which can be used with flanged shafts of conventional size and which are easy to mount and remove.

It is another object of this invention to provide a means for flexibly coupling shafts which have flanges adapted to transmit a relatively high torque per unit of area.

Still another object of the invention is to provide a coupling device having improved flexibility.

Other objects will become apparent from the following detailed description of the invention and with reference to the accompanying drawing in which:

Figure 1 is a plan view illustrating one embodiment of the invention;

Figure 2 is a front elevation view in section taken along the lines 2—2 of Figure 1; and Figure 3 illustrates an embodiment of the invention positioned between two flanged shafts.

The foregoing objects and others are accomplished in accordance with this invention, generally speaking, by providing a shaped flexible shaft coupling device having rigid connecting elements embedded in a substantially nonporous rubber-like polyurethane plastic. More specifically, the invention contemplates a coupling device for joining flanged shafts, wherein metallic ring-like connecting elements are substantially completely enclosed in said substantially nonporous rubber-like polyurethane plastic. Usually, the rigid connecting elements of the coupling device are metallic rings such as a mild steel but, in some instances, they may be made from a hard rigid plastic, porcelain, or the like. The rigid connecting elements are provided with spaced eye-shaped outwardly extending bulges which have tapped holes adapted to receive connecting bolts extending through aligned holes of adjacent flanged shafts. These bulges may recede somewhat behind the mating surface of the coupling device and as a result, the polyurethane plastic encasement material is compressed against the shaft flanges when the connecting bolts are tightened, to provide additional friction locking between the coupling device and the flanged shafts.

In one of the preferred embodiments of the invention, the rigid ring-like connecting elements embedded in the polyurethane plastic are provided with holes in addition to those used to receive the bolts which join the coupling device to the flanged shafts. These additional holes become filled with polyurethane plastic when it is cast about the connecting elements, thereby securely anchoring the said elements in the polyurethane plastic encasement.

In another preferred embodiment of the invention, a metal U-ring is placed over one or both of the mating ends of the coupling device, compressing the flexible polyurethane plastic material in the engaging area.

Any suitable substantially nonporous rubber-like polyurethane may be cast about the connecting elements to perform the coupling provided by this invention, but best results are obtained when the polyurethane has a Shore A hardness of from about 65° to about 95° and an elasticity of from about 30 to about 65%.

The rubber-like portion of the coupling device provided by this invention may be formed from any suitable substantially nonporous or homogeneous rubber-like polyurethane. For instance, the polyurethane may be prepared by reacting any suitable organic polyisocyanate with any suitable organic compound having reactive hydrogens and capable of reacting with the polyisocyanate to form a polyurethane. For example, 1,5-naththylene diisocyanate, p-phenylene diisocyanate or 4,4'-diphenyl dimethylmethane diisocyanate may be reacted with a polyester, polyalkylene ether glycol, a polythioether glycol or the like having terminal groups which are predominately hydroxyl groups and a molecular weight of at least 750 and the resulting product may be cross-linked with an organic chain extender or cross-linker. Suitable cross-linking agents include ethylene glycol, diethylene glycol, butanediol, diprimary aliphatic and aromatic diamines, such as toluylene diamine, or the like. Indeed, any organic compound having reactive hydrogen atoms, organic polyisocyanate and cross-linker disclosed in U.S. Patents 2,729,618; 2,621,166; and 2,620,516 may be used in forming the polyurethanes and any of the processes disclosed in these patents may be followed in making a polyurethane suitable for shaping the joint of this invention. Usually the coupling device will be formed by pouring a molten polyurethane in a suitable mold and about the metal parts to be embedded therein, and the contents of the mold will then be heated until cross-linking and curing has been obtained with soldification of the polyurethane into a hard rubber-like substantially nonporous product having the shape of the mold.

It has been found that the coupling device provided by this invention is not adversely affected by prolonged exposure to whether or such materials as oil and the like. Furthermore, the coupling device will expand or contract uniformly with change in temperature without rupture to the joined shafts.

It should be noted that the hereinbefore mentioned tapped holes in the spaced eye-shaped outwardly extending bulges of the rigid connecting elements permit these elements to be properly placed during the casting operation. It should also be noted that the cross-sectional area of the polyurethane plastic material between the spaced rigid connecting elements, which area is the primary zone of elastic deformation, may be varied to obtain the desired degree of flexibility. Furthermore, radially disposed cooling holes may be provided in this same primary zone of elastic deformation to serve the dual purposes of obtaining a desired degree of flexibility and also to facilitate internal friction heat dissipation.

Referring now to the drawings for a more detailed description of embodiments of the invention, the embodiment of Figures 1 and 2 are provided with ring-like connecting elements 1 substantially embedded in a substantially nonporous rubber-like polyurethane body 2. Said elements are provided with spaced eye-shaped bulges 3 which have tapped holes 4 therein. These holes 4 are free of the polyurethane body 2 and in fact may recede somewhat behind the mating surface of the device, as can be observed at 8. A plurality of openings 5 are provided in the connecting elements 1 which become filled with polyurethane during the casting process, to securely anchor the elements in the polyurethane plastic material 2. A U-shaped metallic ring 9 may be placed on one or both ends of the coupling device in the mating area of the device.

Radial cooling holes 7 may be centrally placed in the polyurethane plastic material 2 between the spaced ring-like rigid connecting elements 1 both to facilitate heat dissipation and as a means of influencing the degree of flexibility in the central area of primary deformation. It should also be noted that in the said central area, the cross-section may be varied, as shown at 6 and 6', in order to obtain the desired degree of flexibility.

Figure 3 is an illustration of the coupling device secured to flanged ends 10 of shafts 11 by connecting bolts 12 and showing the coupling device in its proper position when assembled between two flanged shafts.

The following example illustrates the preparation of one polyurethane suitable for forming the coupling device provided by this invention:

Example 1

1,000 parts by weight of an hydroxyl polyester obtained by thermal esterification of about 11 mols of adipic acid with about 12 mols of ethylene glycol and having an hydroxyl number of about 52 and an acid number of about 1 are heated to a temperature of about 135° C. and under a vacuum of about 12 mm. until the formation of bubbles has stopped and the polyester is completely free from water. Now, 180 parts by weight of naphthylene-1,5-diisocyanate are added at 135° C. to the dehydrated polyester while stirring. As soon as the temperature starts to drop, 20 parts by weight of butylene glycol-1,4 are stirred into the mixture at about 135° C. The resulting mixture is poured into a suitable mold. This has been so designed that the rigid elements 2 are inserted in the mold in properly aligned relation and the polyurethane is cast thereabout and solidified by curing. The above mixture is maintained in the mold at a temperature of about 110° C. for about 24 hours to form a homogeneous polyurethane rubber. After 24 hours the coupling device is removed from the heating chamber and the material then shows the following properties: The Shore A hardness 75°, resiliency 40%, elongation 600%.

It is to be understood that any suitable organic polyisocyanate, organic compound having reactive hydrogen atoms and cross-linking agent may be substituted for those in the foregoing example. Examples of these materials suitable for this purpose are found in the aforesaid patents. Moreover, it is to be understood that variations are permissible in the temperatures and processing steps insolong as the product obtained has the required physical characteristics. The invention thus contemplates in its broadest terms a polyurethane coupling device detachable connected between two flanged shafts and having rigid connecting elements substantially embedded therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

As indicated hereinbefore, the molecular weight of the organic compound having reactive hydrogen atoms which is reacted with the organic polyisocyanate in the preparation of the polyurethane should be at least about 750. Although the chemistry involved in the preparation of the polyurethane is not specifically involved in this invention because any polyurethane having the required physical characteristics may be used to form the coupling device, it is considered advisable to point out that the polyester may be prepared by esterification of any suitable polycarboxylic acid, such as, for example, adipic acid, succinic acid, and the like. A desirable polyalkylene ether glycol may be prepared by the condensation of a lower alkenyl oxide, such as, for example, ethylene oxide, propylene oxide, butylene oxide, and the like.

What is claimed is:

1. A shaft coupling comprising a flexible coupling device adapted to be inserted between a flange on one shaft and a flange on a second shaft, means comprising spaced rigid perforated rings adjacent the mating ends of the device and having tapped holes for connecting the flexible coupling device with said flanges, said tapped holes having I-shaped bulges which protrude in the direction of the flange of the adjacent mating shaft and recede behind the mating surface of the flexible coupling device, said rings being substantially completely embedded in a substantially non-porous rubber-like flexible polyurethane plastic body.

2. A shaft coupling comprising a flexible coupling device adapted to be inserted between a flange on one shaft and a flange on another shaft and having means for connecting the flexible coupling device to the shaft flanges, said means comprising spaced rigid connecting elements substantially completely embedded in a substantially non-porous rubber-like flexible polyurethane plastic body adjacent the mating ends thereof, said plastic body having central radially disposed holes therein.

3. A shaft coupling comprising a flexible coupling device adapted to be inserted between a flange on one shaft and a flange on another shaft and having means for connecting the flexible coupling device to the shaft flanges, said means comprising spaced rigid connecting elements substantially completely embedded in a substantially non-porous rubber-like flexible polyurethane plastic body adjacent the mating ends thereof, said coupling device having U-shaped protecting rings fitted over the mating ends thereof.

4. A shaft coupling device adapted to connect opposing flanges of a pair of shafts together comprising a pair of separate spaced rigid rings substantially completely enclosed in a unitary body of substantially non-porous rubber-like flexible polyurethane plastic with one member of the pair near one mating surface and the other member near the other mating surface of the device, said rings having tapped holes adapted to receive connecting bolts extending through aligned holes of adjacent flanges on said shaft.

5. The device of claim 4 wherein the said polyurethane body is formed from a polyurethane plastic having a Shore A hardness of from about 65° to about 95° and an elasticity of from about 30% to about 65%.

6. The device of claim 4 wherein said rings have perforations therein filled with polyurethane plastic.

7. The device of claim 4 having U-shaped protecting rings fitted over the ends thereof which are adapted to mate with the flanges of the shaft.

References Cited in the file of this patent

UNITED STATES PATENTS

| | | |
|---|---|---|
| 1,479,755 | Stokes | Jan. 1, 1924 |
| 1,642,775 | Henry | Sept. 20, 1927 |
| 1,842,582 | Bulley | Jan. 26, 1932 |
| 2,126,705 | Schmidt | Aug. 16, 1938 |
| 2,271,568 | Olson | Feb. 3, 1942 |